A. L. BAUER.
PLANT PROTECTOR.
APPLICATION FILED JAN. 7, 1916.
1,198,178. Patented Sept. 12, 1916.
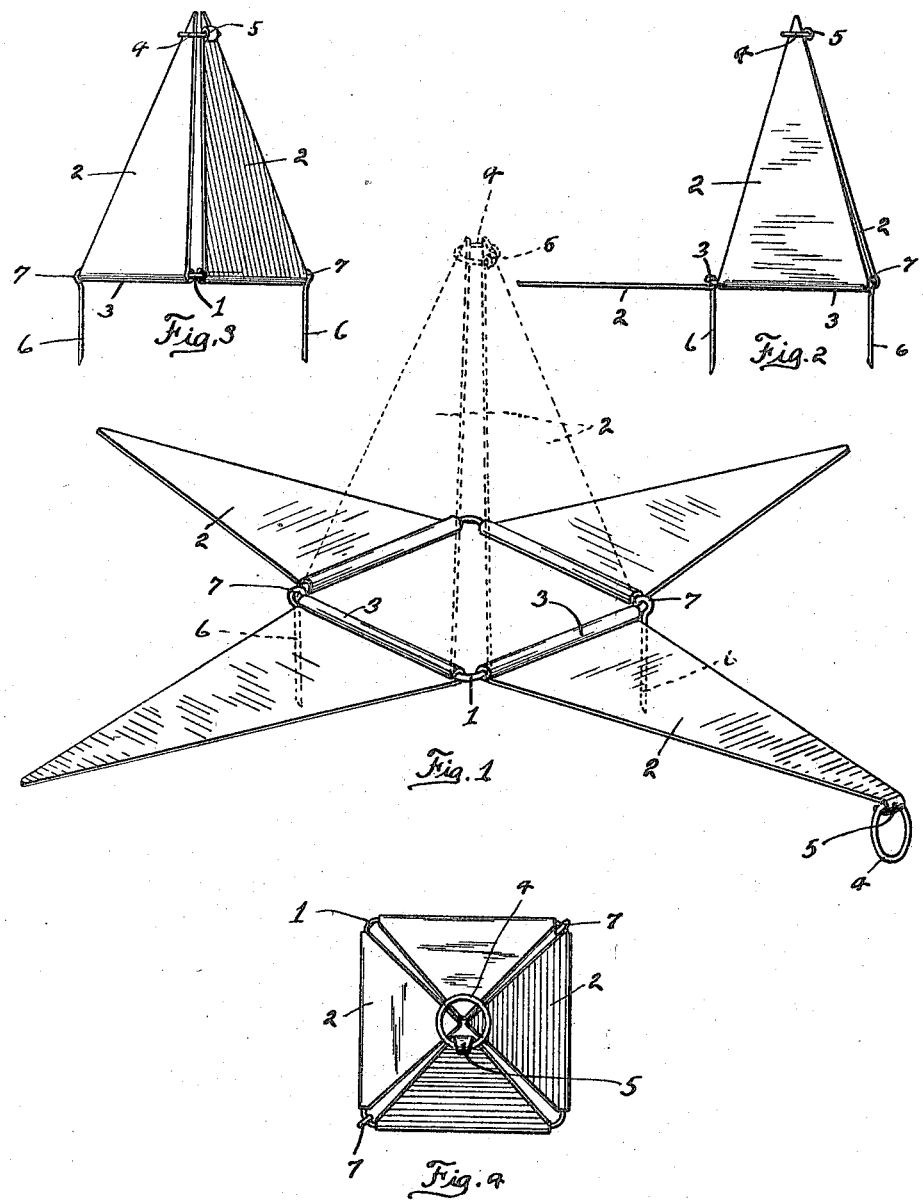

UNITED STATES PATENT OFFICE.

ABRAHAM L. BAUER, OF COLUMBUS, OHIO.

PLANT-PROTECTOR.

1,198,178.  Specification of Letters Patent.  Patented Sept. 12, 1916.

Application filed January 7, 1916. Serial No. 70,877.

*To all whom it may concern:*

Be it known that I, ABRAHAM L. BAUER, a citizen of the United States, residing at Columbus, in the county of Franklin and State of Ohio, have invented certain new and useful Improvements in Plant-Protectors, of which the following is a specification.

My invention relates to plant protectors and is designed primarily as a guard or protector to be used in climates where frosts are prevalent. In addition to this, my invention may be made to serve a useful purpose by so adjusting it to regulate the amount of sun or light to reach a plant with which it is used. My device takes the form of a readily transportable protector element preferably shaped to assume a pyramidal form and so constructed that one or more of the sides constituting the pyramid may be so adjusted as to regulate the amount of light admitted, or certain of the sides may be placed in closed position to prevent the harmful effect wrought by heavy winds.

My invention particularly consists in so constructing the protector as to adjust it to perform the various features outlined above. These adjustments are all shown in the accompanying sheet of drawings, which represent the preferred embodiment of my invention in which similar characters of reference designate corresponding parts, and in which:

Figure 1 is a view showing my protector assembled with the leaves shown in open position in full lines and in closed or operative position in broken lines, Fig. 2 is a reduced side elevation showing one of the leaves in open position and the remainder in closed position, Fig. 3 is a side elevation of the protector taken at 45 degrees from that shown in Fig. 2, with all of the leaves in closed position, and, Fig. 4 is a top plan view of all of the leaves in closed position.

In these several views, it will be noted that the protector consists essentially of a base frame 1 preferably formed of wire bent to the desired polygonal form. In the present illustration this wire is shown as bent to assume the shape of a square and to each of the four sides of this square there is pivotally connected a panel 2 the pivotal connection taking the form of a curl 3 on the lower edge of each of the panels. These panels are themselves preferably of triangular form cut to suit conditions, so that when assembled they present the form of a pyramid as is shown in Figs. 2 and 3 and also shown in broken lines in Fig. 4. In order that these panels may be securely held in this position, I have provided one of them with a ring 4, this ring being secured to the pointed ends of one of the panels by curling over the pointed end, as is shown at 5. Thus, when certain or all of the panels are moved to their closed or operative position, the ring may be swung over their pointed ends, after the manner shown in Figs. 2 and 3 to hold them securely in this position. Should it be desired to regulate the amount of light on a plant or to protect it from the action of winds, one or two of the panels may be left in open position, while the other two are placed in closed position. In doing this, care must be taken to so position the protector that the panel carrying the ring 4 is one of those in closed position and its ring may then be made to engage the pointed end of the remaining sections. In order to anchor the protector in any position, I have provided it with a pair of depending anchor rods 6 pivoted to the corners of the frame 1 by curling one end as is shown at 7. These anchors may be securely pressed in the ground or they may be used as a medium for spacing the lower edge of the protector as a whole from the ground should a slight space be considered desirable.

From the foregoing description, it will be apparent that I have provided a protector which embodies features of considerable utility. As already stated, it may be used as a guard for frost or it may be used to regulate the admission or the intensity of light and also as a protector against the action of winds. All that is necessary in either event is the proper locating of the protector as a whole and then adjusting the various panels as may be desired.

What I claim, is:

1. A plant protector comprising a multi-sided base frame formed of a wire properly shaped, and a plurality of panels hingedly mounted on said wire base frame, said panels being of proper shape to form a pyramid when assembled.

2. A plant protector comprising a multi-sided base frame formed of a wire properly shaped, a plurality of panels hingedly mounted on said wire base frame, said panels being of triangular shape to form a pyramid when assembled, and means for locking the pointed ends of said panels together.

3. A plant protector comprising a multi-sided base frame formed of a wire properly shaped, a plurality of triangularly shaped panels whose base edges are curled around said wire base to form a hinge connection, and a ring secured to the pointed end of one of said panels by turning the pointed end of the panel over it, said ring engaging the pointed ends of the other panels to hold them to pyramid form.

In testimony whereof I affix my signature in presence of two witnesses.

ABRAHAM L. BAUER.

Witnesses:
C. C. SHEPHERD,
WALTER E. L. BOCK.

Copies of this patent may be obtained for five cents each, by addressing the "Commissioner of Patents, Washington, D. C."